Nov. 28, 1939.    H. C. MABIE    2,181,377

TRACK FOR PNEUMATIC-TIRED VEHICLES

Filed Feb. 8, 1938

Inventor
Henry C. Mabie
by Heard Smith & Tennant.
Attys.

Patented Nov. 28, 1939

2,181,377

UNITED STATES PATENT OFFICE 2,181,377

TRACK FOR PNEUMATIC-TIRED VEHICLES

Henry C. Mabie, Jamaica Plain, Mass.

Application February 8, 1938, Serial No. 189,418

3 Claims. (Cl. 238—6)

This invention relates to a roadway and track for pneumatic-tired vehicles, and it has for its object to provide a roadway having a novel track constructed so that when the pneumatic-tired vehicle traveling over the roadway is on the track it will automatically follow the track and remain thereon.

My improved track is in the form of two parallel ridges spaced apart a distance equal to the gauge of the rubber-tired vehicle. Each ridge preferably has flat converging sides which meet at the apex of the ridge, and while the angle formed between the sides of the ridges may vary somewhat I will preferably construct the ridges with a relatively wide base so that the angle between the sides at the apex of the ridge is an obtuse angle.

When the pneumatic-tired vehicle is riding along the apices of the ridges the portion of the tread surface of the tire which engages the ridge will be indented somewhat by the apex of the ridge so that the tire will spread over both sides of the ridge. If the wheels tend to run off from the apex of the ridge and to travel along the sides of the ridge, the portion of the tread surface of the tire engaging the ribs will be deformed to conform to the slope of the side of the ridge. As a result the portion of the tire running along the base of the ridge has a greater radial dimension than the portion of the tire running along near the top of the ridge, and the consequent greater peripheral speed of the portion of the tire having the greater radial dimension and which contacts with the base of the ridge over the peripheral speed of the portion of the tire having the smaller radial dimension, and which contacts with the ridge near the apex will bend to turn the wheel so as to cause it to climb back onto the ridge of the track. Therefore, any tendency of the wheels to run off from the apex of the ridge on either side will be automatically corrected and the wheels will automatically follow along the apices of the ridges.

In order to give an understanding of the invention I have illustrated in the drawing some selected embodiments thereof which will now be described after which the novel features will be pointed out in the appended claims.

Figure 1:
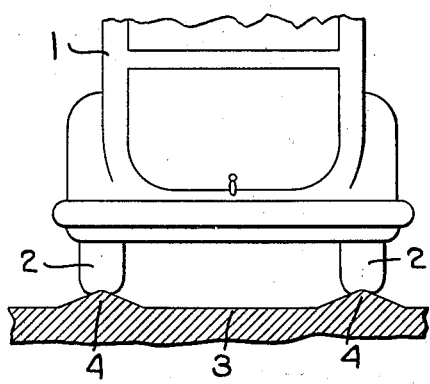
Fig. 1 is a view illustrating an automobile traveling on my improved track.
Figure 2:
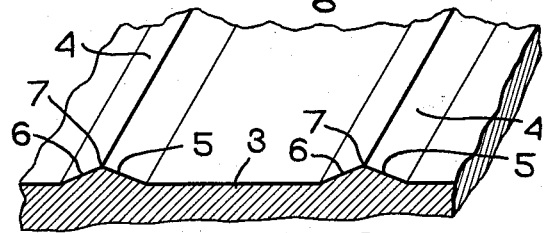
Fig. 2 is a fragmentary perspective view showing one embodiment of the invention.

In the drawing 1 indicates an automobile or other vehicle having pneumatic tires 2.

3 indicates a roadway which may have any usual construction except that it is formed with two parallel ridges 4 that extend lengthwise of the roadway and which are spaced apart a distance equal to the gauge of the vehicle 1, that is, a distance equal to that between the centers of the two wheels on opposite sides of the vehicle. The cross-sectional shape of the ridges 4 may vary more or less without departing from the invention but I prefer to make the ridges with the relatively flat sides 5 and 6 which converge toward each other and meet at the apex 7 of the ridge. These ridges also preferably have a base width greater than their height so that the sides 5 and 6 of each ridge make an obtuse angle with each other at the apex. The width of each side 5 and 6 of each ridge is also preferably at least as great as the cross-sectional diameter of the pneumatic tire.

Assuming that a vehicle 1 is traveling on the track and that the tires 2 of the vehicle are centered on the apices 7 of the ridges, in such case the portion 8 of each tire which engages the track will be indented at the center of the tread surface of the tire as shown at 9 and the tire will conform to the ridge so that portions 10 of the tread surface will engage with the upper portions of the two sides 5 and 6 of the ridge.

Figure 5:
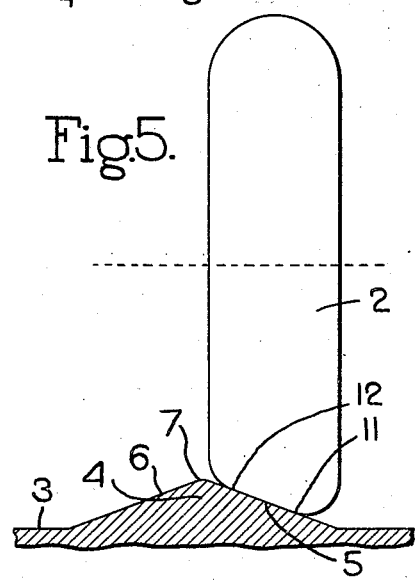
Fig. 5 is an enlarged sectional view showing diagrammatically the manner in which a pneumatic tire tends to hold its course along the track.
Figure 4:
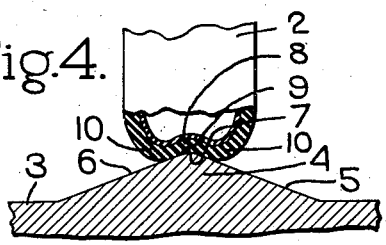
Fig. 4 is an enlarged sectional view through one of the ridges illustrating the manner in which the pneumatic tire travels on the ridge.
Figure 7:
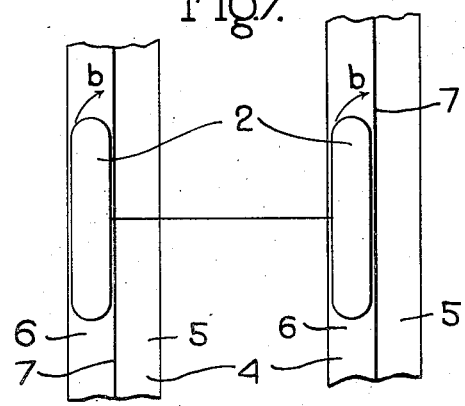
Figs. 6 and 7 are diagrammatic views showing a plan view of the track and illustrating how the pneumatic tires automatically maintain their position on the track when the vehicle is traveling thereon.
Figure 6:
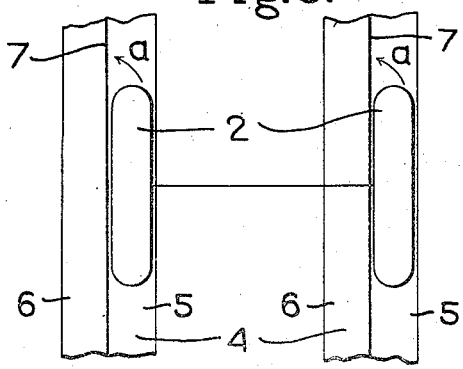

If the wheels start to run off the side of the ridge, then the tread surface of the tire will conform to the shape of the portion of the ridge on which it is running, and assuming that the wheels are running on the right-hand inclined face 5 of the ridges the tread portion of the tire which engages the ridge will be deformed to the shape shown in Fig. 5, wherein the portion 11 on that side of the tire which is running along adjacent the base of the ridge will have a greater radial dimension than the portion 12 of the tire which is running along adjacent the apex of the ridge. Because of this shape of the tire the portion 11 of larger radial dimension will have a greater surface speed than the portion 12 of smaller radial dimension, and this greater surface speed of the portion of the tire traveling along near the base of the ridge will tend to cause the wheel to turn toward the apex of the ridge so that the wheel will tend to climb up the inclined face 5 of the ridge and return to the central position on the apex of the ridge shown in Fig. 4.

On the other hand if the wheel tends to run off onto the side 6 of the ridge then the same forces are set to work to automatically return the wheel again to the apex of the ridge. The wheels, therefore, will automatically run along the apices of the ridges because as soon as any wheel tends to run off from the apex the forces above-referred to immediately come into play to bring the wheel back onto the apex of the ridge. It will be noted that the side faces 5 and 6 of the ridge form between them a sufficiently wide obtuse angle so that the angle between each side face and the road surface is somewhat more than 135°. The advantage of this is that the slope of the sides 5 and 6 is such that the frictional contact between the tire and the slope is sufficient to overcome the gravitational action tending to cause the tire to slide down the side face transversely thereof.

Figure 3:
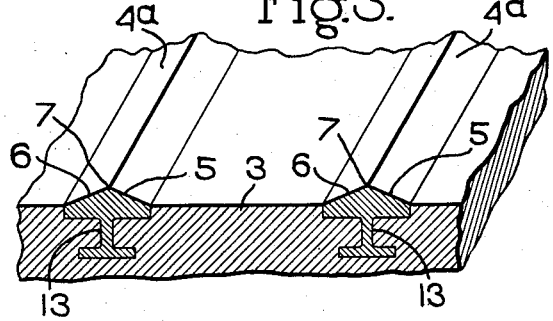
Fig. 3 is a similar view showing a different embodiment of the invention.

These ridges 4 may be made in any suitable way without departing from the invention. Assuming that the road has a concrete surface it is possible to shape the road surface so that the ridges 4 will be formed of the same concrete mixture as that of the road bed 13. In Fig. 3 I have shown a construction where the ridges are formed by rails 13 which are set into the roadbed, each rail having its upper portion 14 of the proper cross-sectional shape to form the desired ridge-like track.

My invention may be embodied in a roadway having a road surface on which vehicles may travel that are not traveling on the track, or said invention may be embodied in a roadway having only the ridges on which the pneumatic-tired wheels of the vehicle may travel.

I have illustrated herein the invention as applied to a roadway having a road surface in addition to the track feature of the invention.

From the above it will be observed that my invention involves the use of two ridges, the tread surface of each of which is crowned in a transverse direction, each ridge having a width at least as great as the transverse diameter of the pneumatic tire.

As stated above the invention may be embodied in roadways other than those which have a road surface 3 adjacent the ridges on which a vehicle may travel and, therefore, I do not wish to be limited to the construction herein shown.

I claim:
1. A roadway for a pneumatic-tired vehicle, said roadway presenting a road surface and two parallel ridges rising from said surface and extending lengthwise of the roadway, said ridges being spaced apart a distance equal to the gauge of said vehicle, and each ridge presenting two flat converging sides meeting at the apex of the ridge, each side having a transverse dimension of sufficient extent to provide a surface on which the pneumatic tire may roll without contacting with the road surface, and the two sides forming between them a sufficiently wide obtuse angle, whereby the frictional engagement of the tire with either side face is sufficient to prevent the tire from slipping by gravity transversely of the side face toward the bottom thereof.

2. A roadway for a pneumatic-tired vehicle, said roadway presenting a road surface and two parallel ridges rising from said surface and extending lengthwise of the roadway, said ridges being spaced apart a distance equal to the gauge of said vehicle, and each ridge presenting two flat converging sides meeting at the apex of the ridge and forming an obtuse angle with each other, the width of each flat side of the ridge being at least as great as the transverse diameter of the pneumatic tire, whereby the frictional engagement of the tire with either flat side of the ridge is sufficient to prevent the tire from slipping by gravity transversely of the flat side toward the bottom thereof.

3. A roadway for pneumatic-tired vehicles, said roadway presenting two parallel ridges extending lengthwise of the road and spaced apart a distance equal to the gauge of said vehicle, the tread surface of each ridge being crowned in a transverse direction and each ridge having a width at least as great as twice the transverse diameter of the pneumatic tire, each side of each ridge having a gentle as distinguished from a steep upward slope from the road surface, whereby the frictional contact of the tire with either side face will prevent the tire from having a gravitational sidewise slipping movement on the side face as it travels thereover.

HENRY C. MABIE.